United States Patent [19]

Koyama et al.

[11] Patent Number: 5,274,024
[45] Date of Patent: Dec. 28, 1993

[54] OXYGEN-ABSORBING RESIN COMPOSITION CONTAINING WATER-ABSORBING POLYMER, OLEFIN RESIN AND OXYGEN SCAVENGER

[75] Inventors: Masayasu Koyama, Zushi; Yasuhiro Oda, Yokohama; Muneki Yamada, Fujisawa, all of Japan

[73] Assignee: Toyo Seikan Kaisha Ltd., Tokyo, Japan

[21] Appl. No.: 873,610

[22] Filed: Apr. 22, 1992

Related U.S. Application Data

[63] Continuation-in-part of Ser. No. 659,360 filed as PCT/JP90/00563, Apr. 27, 1990, abandoned.

[30] Foreign Application Priority Data

May 23, 1989 [JP] Japan ................. 1-127829

[51] Int. Cl.⁵ .............. C08J 5/10; C08K 3/08; C08L 33/08
[52] U.S. Cl. .................. 524/440; 524/431; 524/439; 524/502; 524/503
[58] Field of Search ............. 524/431, 439, 440, 502, 524/503

[56] References Cited

U.S. PATENT DOCUMENTS 4,877,664 10/1989 Maeda et al. ............... 428/35.9

FOREIGN PATENT DOCUMENTS 0221549 5/1987 European Pat. Off. .
5590535 7/1980 Japan .

OTHER PUBLICATIONS

World Patent Index Latest, Week 8539, Aug. 19, 1985.
Chemical Abstracts, vol. 95, No. 11, Feb. 19, 1981.

*Primary Examiner*—Paul R. Michl
*Assistant Examiner*—U. K. Rajguru
*Attorney, Agent, or Firm*—Sughrue, Mion, Zinn, Macpeak & Seas

[57] ABSTRACT

Disclosed is an oxygen-absorbing resin composition valuable for preserving water-containing contents such as drinks and precooked food, which comprises a heat-formable resin or resin composition having an oxygen permeation coefficient larger than $10^{-12}$ cc·cm/cm²·sec·cmHg at a temperature of 20° C. and a relative humidity of 0% and a water adsorption of at least 1% in pure water at 20° C., and an oxygen scavenger incorporated into said resin or resin composition, and a laminate, a liner, a cap and a vessel, which are formed by using this oxygen-absorbing resin composition.

3 Claims, 2 Drawing Sheets

OXYGEN-ABSORBING RESIN COMPOSITION CONTAINING WATER-ABSORBING POLYMER, OLEFIN RESIN AND OXYGEN SCAVENGER

CROSS-REFERENCE TO RELATED APPLICATIONS

This is a continuation-in-part application of Ser. No. 07/659,360 filed as PCT/JP90/00563, Apr. 27, 1990, now abandoned.

TECHNICAL BACKGROUND

The present invention relates to an oxygen-absorbing composition, and particularly to an oxygen-absorbing resin composition comprising a blend of a heat-formable resin having a relatively large oxygen permeation coefficient and water absorption with an oxygen scavenger.

The present invention also relates to a liner or packing composed of the above-mentioned resin composition which is excellent in adhesive properties, openability, as well as, the above-noted properties.

Moreover, the present invention relates to a cap provided with a liner or packing composed of the above-mentioned resin composition or relates to a packaging vessel comprising a layer composed of the same resin composition.

CONVENTIONAL TECHNIQUE

In a sealed packaging vessel, there is present a head space where the content is not filled, and such troubles as oxidation, deterioration and degradation of the content are caused by oxygen left in the head space.

Use of an oxygen scavenger has been tried from old for removing oxygen in a vessel. For example, Japanese Examined Patent Publication No. 62-1824 discloses application of this technique to a vessel wall. Namely, a packaging multi-layer structure formed by laminating a layer of a composition comprising a resin having an oxygen permeability, such as polyethylene, and an oxygen scavenger composed mainly of a reducing agent, with a layer having an oxygen barrier property, is disclosed.

In Japanese Unexamined Patent Publication No. 57-179273, we propose a sealing composition to be applied a vessel or cap, comprising an elastomer polymer and a water-insoluble oxygen absorber in an amount of 0.1 to 50 parts by weight per 100 parts by weight of solids of the elastomer polymer.

SUMMARY OF THE INVENTION

In the above-mentioned oxygen-absorbing resin composition used in the conventional technique, since the resin per se has a large oxygen permeation coefficient, it is expected that the oxygen-absorbing speed is probably high. However, the oxygen-absorbing speed is much lower than the oxygen-absorbing speed attained in the case where a paper-packaged oxygen-absorbing agent is directly charged, and the oxygen-absorbing effect is not satisfactory.

It is therefore a primary object of the present invention to provide a heat-formable oxygen-absorbing resin composition having a high oxygen-absorbing speed and an excellent oxygen-absorbing capacity.

Another object of the present invention is to provide a cap or packaging vessel formed by using the above resin composition, which is valuable for preserving water-containing contents such as drinks and precooked foods and is excellent in the sanitary effect because oxygen in the interior is promptly absorbed or permeation of oxygen from the outside is effectively cut.

In accordance with the present invention, there is provided an oxygen-absorbing resin composition comprising a heat-formable resin or resin composition having an oxygen permeation coefficient larger than $10^{-12}$ cc·cm/cm$^2$·sec·cmHg at a temperature of 20° C. and a relative humidity of 0% and a water adsorption of at least 1% in pure water at 20° C., and an oxygen scavenger incorporated into said resin or resin composition.

The heat-formable resin used in the present invention is a blend of an olefin resin with a water-absorbing resin. More specifically, it is a blend of a polymer selected from the group consisting of a modified polyethylene oxide, a vinyl alcohol polymer, a sodium acrylate polymer and an acrylic acid/vinyl alcohol copolymer with an olefin resin.

An advantage of using such a polymer blend in the present invention is set forth below.

In order to sufficiently enable the effectiveness of the oxygen scavenger blended in the resin composition, it is necessary to add an oxygen-absorbing agent to a resin having a sufficiently large oxygen permeation coefficient and water retention.

However, water-absorbing resins are ordinarily inferior in heat-formability so that most of these resins are not able to achieve the advantages of the present invention.

Each water-absorbing resin mentioned as a blend component in the present invention has relatively good heat extrusion ability or heat formability. However, if it is used solely in the presence of an oxygen-absorbing agent, deterioration of the resin is promoted by the effect of the oxygen-absorbing agent. As a result, it becomes difficult to obtain a formed article having good flavor and formability.

Therefore, the present invention solves this problem by blending an olefin resin with the above-specified water-absorbing resin.

The blend comprising the specific resin combination of the present invention has excellent stability and heat-formability due to the olefin resin as well as excellent water retention and oxygen permeation due to the water-absorbing resin, so that it can be used to produce a resin composition which is suitable for a laminate for a cap liner or packaging vessel.

Moreover, the resin composition according to the present invention can also provide high sealing ability and openability, which are both necessary in particular for a cap liner.

The above-mentioned resin composition can be arranged in the form of a liner or packing in a cap for absorbing oxygen in the head space. Furthermore, the composition can be used for absorbing oxygen in a multi-layer vessel comprising a layer of the composition.

It is important that the oxygen-absorbing resin composition of the present invention should have all of the following three characteristics.

(1) The oxygen permeation coefficient at a temperature of 20° C. and a relative humidity of 0% is larger than $10^{-12}$ cc·cm/cm$^2$·sec·cmHg.

(2) The water adsorption in pure water at 20° C. is at least 1%.

(3) The composition has a heat formability.

In order to include an oxygen scavenger into a packaging material, it is necessary to disperse the oxygen scavenger into the resin, and in order to perform the absorption of oxygen through the resin effectively, the above-mentioned property (1) is inevitably necessary.

However, it was found that only the property (1) is insufficient for attaining a satisfactory oxygen-absorbing speed.

The oxygen scavenger has, in general, a reducing property, and the oxygen scavenger catches oxygen while it is oxidized by oxygen. The presence of water is indispensable for this oxidation reaction, that is, scavenging of oxygen.

In the present invention, the resin or resin composition per se has a water-absorbing property, and since this water-absorbing resin or resin composition is always present around the oxygen scavenger, water caught by the resin or resin composition is effectively utilized for the oxidation of the oxygen scavenger.

In FIG. 1 of the accompanying drawings, there is plotted the relation between the number of elapsing days and the amount absorbed of oxygen, observed when various resins containing 25% by weight of an oxygen scavenger (iron type) are used for liners. In FIG. 1, curve A shows the results of a liner composed of a composition of a resin having the above-mentioned properties (1) and (2) (described in Example 1) and an oxygen scavenger, curve B shows the results of a liner composed of a composition comprising a resin having only the above-mentioned property (1) (polyethylene) and an oxygen scavenger, and curve C shows the results of a liner composed of a composition comprising a resin having only the property (2) (ethylene/vinyl alcohol copolymer) and an oxygen scavenger. It is understood from FIG. 1 that when a resin having both of the properties (1) and (2) is used, a high oxygen-absorbing speed is obtained.

Incidentally, a resin having a large water adsorption is generally poor in the heat formability, and if the resin is melt-kneaded with an oxygen scavenger, discoloration by intermolecular dehydration and deterioration of the resin by cutting of the main chain or crosslinking are readily caused.

In the present invention, the above-mentioned problem can also be solved by using a blend of a polymer selected from the group consisting of a modified polyethylene oxide, a vinyl alcohol polymer, a sodium acrylate polymer and an acrylic acid/vinyl alcohol copolymer with an olefin resin.

Figure 1:
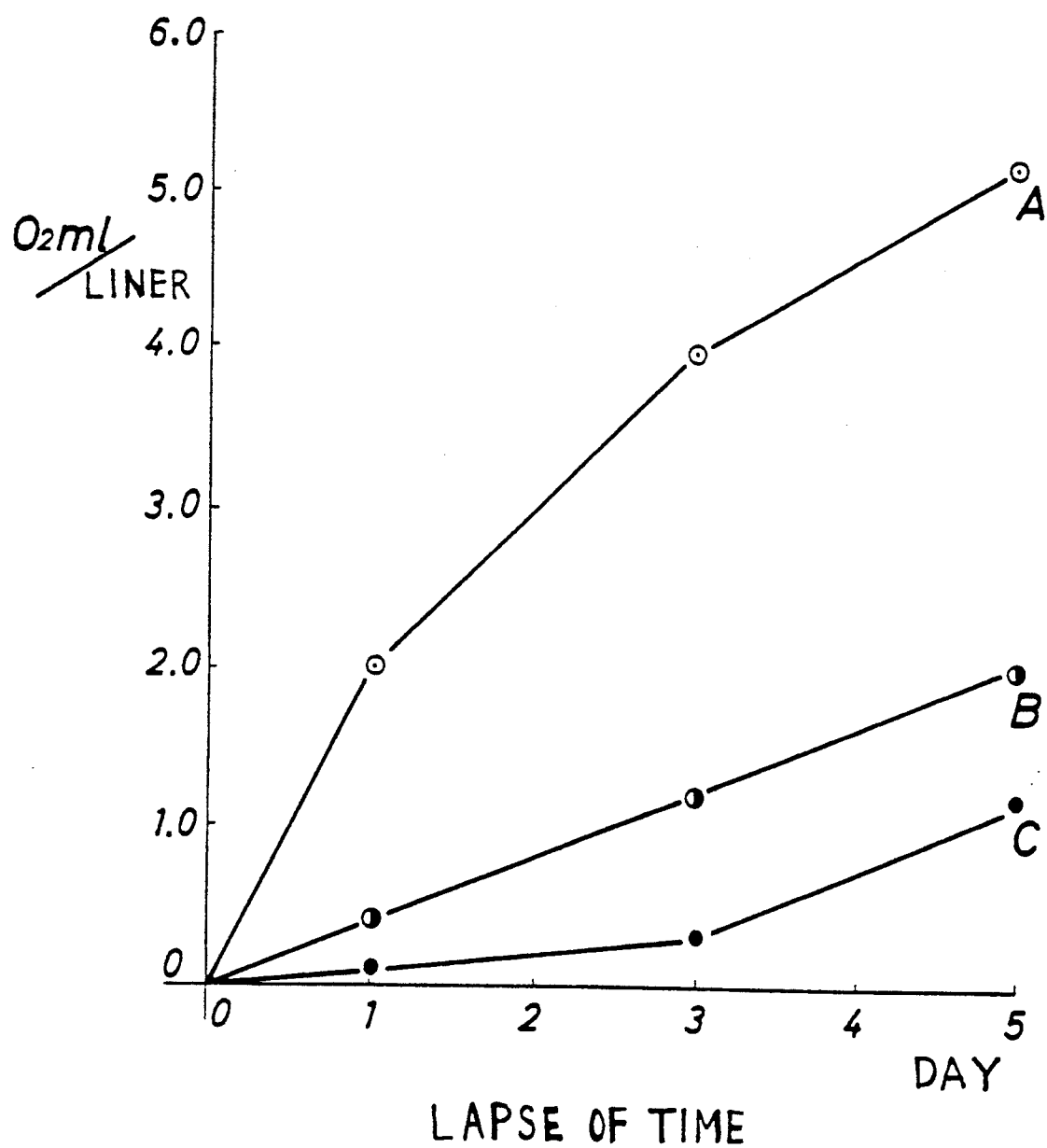
FIG. 1 illustrates the relation between the oxygen, absorbing capacity per liner, plotted on the ordinate, and the number of elapsing days, plotted on the abscissa, which is observed with respect to various liners of the oxygen scavenger-containing, oxygen-absorbing composition of the present invention.

1: oxygen scavenger-containing resin composition layer
2: inner layer
3: outer layer
4: gas-barrier resin layer
5: moisture-resistant resin layer
6: metal foil
7a through 7g: adhesive layers

PREFERRED EMBODIMENTS OF THE INVENTION

All of oxygen scavengers customarily used in this field can be used for the oxygen-absorbing composition of the present invention. In general, a substantially reducing, water-insoluble oxygen scavenger is preferably used. As suitable examples, there can be mentioned powders having a reducing property, such as reducing iron, reducing zinc and reducing tin powders, low oxides of metals such as ferrous oxide and triiron tetroxide, and reducing metal compounds such as iron carbide, ferrosilicon, iron carbonyl and iron hydride. These oxygen scavengers can be used singly or in the form of a mixture of two or more of them. Moreover, these oxygen scavenger can be used in combination with assistants, for example, hydroxide, carbonates, sulfites, thiosulfates, tertiary phosphates, organic acid salts and halides of alkali metals and alkaline earth metals, and active carbon, active alumina and activated acid clay, according to need.

Furthermore, there can be mentioned polymeric compounds having a polyhydric phenol in the skeleton, for example, polyhydric phenol-containing phenol/aldehyde resins.

It is generally preferred that the oxygen scavenger should have an average particle size smaller than 100 $\mu$m, especially smaller than 50 $\mu$m.

An oxygen scavenger for resins, comprising reducing iron and an oxidation promoter, in which the content of copper is lower than 150 ppm based on iron and the sulfur content is lower than 500 ppm based on iron, is especially preferably used as the oxygen scavenger for the oxygen-absorbing composition of the present invention.

Reducing iron preferably used for the oxygen scavenger can be obtained by reducing iron oxide (for example, mill scale) obtained at the iron-manufacturing step with coke, pulverizing formed sponge iron and subjecting the pulverized sponge iron to a finish reducing treatment in hydrogen gas or cracked ammonia gas, or by electrolytically precipitating iron from an aqueous solution of iron chloride obtained at the pickling step, pulverizing the precipitated iron and subjecting the pulverized iron to a finish reducing treatment. Iron oxides such as iron rusts formed on the surfaces of products during the iron and steel production process are relatively pure, and also iron chloride obtained by pickling these rusts is relatively pure. Sulfuric acid has generally been used for pickling, but if sulfuric acid is used, sulfur is contained in reducing iron at a level exceeding the allowable limit in the present invention, and use of this acidic iron is not suitable in the present invention. Furthermore, use of scrap iron as the starting material for the production of iron oxide should be avoided because a copper component is incorporated. Reduction firing of iron oxide is generally carried out at a temperature of about 600° to about 1200° C.

It is generally preferred that the particles size (median diameter) of reducing iron be in the range of from 0.1 to 100 $\mu$m. The smaller is the particle size, the higher is the oxygen-absorbing property. However, if the particle size is smaller than 1.0 $\mu$m, at mixing or kneading in air, self-generation of heat is often caused. Accordingly, special means such as the treatment in a nitrogen current becomes necessary. If the particle size is larger than 2.0 $\mu$m, the treatment in air becomes possible.

The production of reducing iron is not limited to the above-mentioned reduction firing of pickled iron. If iron in the starting material is pure, reducing iron can be prepared by spraying of fused iron into a non-oxidizing atmosphere, pulverization of pure metallic iron and steam thermal decomposition of iron carbonyl.

As the oxidation promoter, an electrolyte free of a copper component or a sulfur component is used. In view of the easiness of incorporation into a resin and the stability, an inorganic salt is preferably used as the electrolyte, and a chloride of an alkali metal or alkaline earth metal is especially preferably used. A nitrate and a phosphate are not suitable because discoloration of the resin is readily caused. A combination of sodium chloride and calcium chloride is especially suitable as the oxidation promoter. If this oxidation promoter is used in combination with a manganese salt such as manganese chloride ($MnCl_2$), the absorption of oxygen is effectively enhanced by promotion of the oxidation.

It is preferred that the reducing iron and oxidation promoter be used at a weight ratio of from 99.9/0.1 to 80/20, especially from 98/2 to 90/10, supposing that the total amount of the reducing iron and oxidation promoter is 100. Preferably, the oxidation promoter comprises 0.05 to 15.0% by weight of sodium chloride, 0.01 to 15.0% by weight of calcium chloride and 0.01 to 5.0% by weight of manganese chloride.

Furthermore, an assistant such as active carbon, active alumina or activated acid clay can be used in combination with the reducing iron and oxidation promoter according to need.

The resin composition used for the oxygen-absorbing composition in the present invention is a blend of a specific water-absorbing resin with an olefin resin, more specifically, it is a blend of a polymer selected from the group consisting of a modified polyethylene oxide, a vinyl alcohol polymer, a sodium acrylate polymer and an acrylic acid/vinyl alcohol copolymer with an olefin resin.

The modified polyethylene oxide to be used as the water-absorbing resin includes polymers obtained by graft modification of polyethylene oxide with an ethylene-type unsaturated carboxylic acid or the acid anhydride thereof, such as maleic anhydride, acrylic acid, methacrylic acid, crotonic acid and itaconic anhydride. The resin has high water-absorption because of a plurality of repeating ether units and graft-modified carboxyl groups contained therein. In addition, the ether groups are a main cause of high water-absorption which leads to excellent heat resistance and good heat-formability.

The vinyl alcohol polymer includes polymers ordinarily used for producing resin films, fibers, adhesives, coating materials or the like materials. Incidentally, the vinyl alcohol polymer or polyvinyl alcohol to be used in the present invention is not necessarily limited to such polymers as to be used as textile materials for which a relatively high saponification value is required. Namely, it is possible to use vinyl alcohol polymers for producing adhesives or the like materials having a relatively lower saponification value.

More specifically, the vinyl alcohol polymer preferably used in the present invention is KURARAY POVAL® PVA-203, -210, -217, -CS, -HM, having a relatively low saponification value.

Moreover, for example, SUMICAGEL® SP-510, SP-520 or the like material can be the acrylic acid/vinyl alcohol copolymer, and SUMICAGEL N-100, NP-1010 or the like material can be the sodium acrylate polymer.

In addition, the olefin resin to be blended with the water-absorption resin mentioned above can include, for example, low-, medium- or high-density polyethylene, isotactic polypropylene, propylene-ethylene copolymers, polybutene-1, ethylene-butene-1 copolymers, propylene-butene-1 copolymers, ethylene-propylene-butene-1 copolymers, ethylene-vinyl acetate copolymers, ion-crosslinked olefin copolymers (ionomers) or blends of these materials.

The blend ratio is not limited in particular; however, it is preferable, in view of oxygen absorption and heat formability, to set the ratio between the high water-absorption resin and the olefin resin at 1:99 to 99:1, particularly 10:90 to 90:10.

It is preferred that the oxygen scavenger be incorporated in an amount of 1 to 1000 parts by weight, especially 5 to 200 parts by weight, per 100 parts by weight of the above-mentioned resin or resin composition. If the amount of the oxygen scavenger is below the above-mentioned range, the oxygen-absorbing performance tends to decrease, and if the amount of the oxygen scavenger exceeds the above-mentioned range, the heat formability is often degraded.

The oxygen-absorbing resin composition of the present invention can be applied to the inner surface of a cap or a vessel so that the layer of the resin composition is exposed, or the oxygen-absorbing resin composition can be arranged on the inner surface side through a thin layer of a moisture-resistant resin such as an olefin resin. In the latter case, since the moisture-resistant resin layer prevents direct contact between the oxygen scavenger and the content, a high flavor-retaining effect is attained.

Though such a thin layer of the olefin resin may be, of course, a thin layer of the resin itself, it may also be a porous layer having a plurality of fine through holes. Further, the layer may be at least one layer of a resin other than the oxygen-absorbing layer which comprises a large number of perforated micro-pores.

In such a case, while a gaseous material including oxygen, water vapor or the like can pass freely through the thin layer, a liquid material to be contained in the vessel does not permeate into the layer. Thus, the contents of the vessel do not reach and affect the oxygen-absorbing-agent layer.

Preferably, the gas permeability of such porous films is 100 sec/100 cc.

Figure 2:
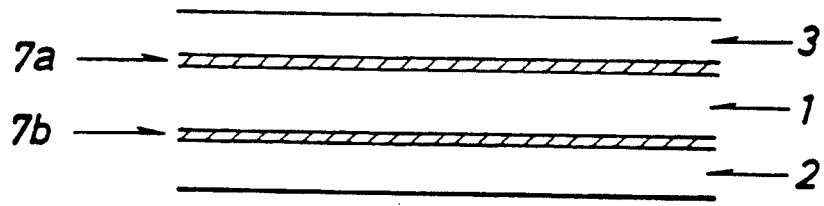
FIG. 2 is a sectional view showing an example of the laminate suitable for a liner of a cap or a packing.

FIG. 2 illustrates an example of the laminate suitable for a liner or packing of a cap. This, laminate comprises an intermediate layer 1 composed of an oxygen scavenger-containing resin composition, an inner layer 2 which is a thin layer of a moisture-resistant resin, and an outer layer 3 formed according to need. The thickness of the inner layer is generally 1 to 20 μm.

The inner layer 2 allows permeation of oxygen and water vapor and exerts a function of preventing direct contact between water and the oxygen scavenger. If necessary, adhesive layers 7a and 7b can be formed between every two adjacent layers. The outer layer 3 exerts functions of making heat sealing of this liner or packing to a cap (not shown) easy and acting as a protecting layer when the liner and cap are prepared in advance. This laminate can be used, for example, for absorbing oxygen by laminating the laminate on the can end of a metal can.

Figure 3:
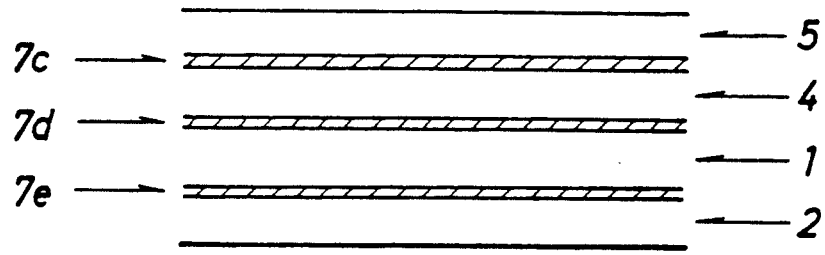
FIGS. 3 and 4 are sectional views showing examples of the laminate suitable for a vessel.

FIG. 3 illustrates an example of the structure of the laminate suitable for a vessel, and this laminate comprises a layer 1 of an oxygen-absorbing resin composition and a layer 4 of a gas-barrier resin. An oxygen scavenger is incorporated in the oxygen-absorbing resin composition layer 1, and a moisture-absorbing resin layer 5 is formed on one surface of the gas-barrier resin layer 4 for preventing absorption of moisture from the outside. Furthermore, a layer 2 allowing permeation of oxygen and water vapor and preventing direct contact between the liquid water component and the first layer can be formed according to need.

Figure 4:
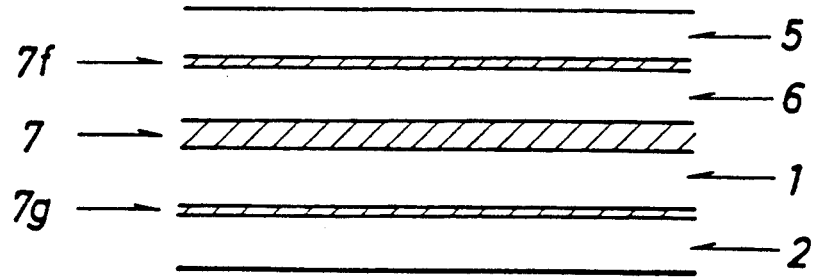

FIG. 4 illustrates another example of the structure of the laminate suitable for a vessel. This laminate comprises a layer 1 of an oxygen scavenger-incorporated oxygen-absorbing resin composition and a metal foil 6. In this embodiment, an adhesive layer 7 formed for bonding the oxygen-absorbing resin composition to the metal foil. Furthermore, inner and outer layers 2 and 3 can be formed according to need. In the laminates shown in FIGS. 3 and 4, adhesive layers 7c, 7d, 7e, 7f and 7g can be formed between every two adjacent layers according to need.

EXAMPLES

The present invention will now be described with reference to the following examples.

EXAMPLE 1

A polyolefin composition pellet having an oxygen permeation coefficient of $4 \times 10^{-10}$ cc·cm/cm$^2$·sec·cmHg at a temperature of 20° C. and a relative humidity of 0%, and a polypropylene master batch (Sumika Gel GRC PPM-3) of modified polyethylene oxide (Sumika Gel R-30) having a water absorption ratio of 30 were mixed at a weight ratio of 2/1, and an iron type oxygen scavenger having an average particle size of 40 μm was further mixed in an amount of 25% by weight based on the resin by a batch type high-speed stirring vane type mixer (Henschel mixer). The mixture was pelletized by a pelletizer comprising an extruder having a 50-mm diameter screw built therein, a strand die, a blower cooling tank and a cutter. The pellet was formed into a liner having a diameter of 38 mm (liner A) by using an extruder having a 28-mm diameter screw built therein. For comparison, liners (liners B and C) were formed by using a pelletized product of a mixture of an olefin resin composition having an oxygen permeation coefficient of $3.9 \times 10^{-10}$ cc·cm/cm$^2$·sec·cmHg at a temperature of 20° C. and a relative humidity of 0% with 25% by weight of an iron type oxygen scavenger and using a pelletized product of a mixture of an ethylene/vinyl alcohol copolymer (ethylene content of 32 mole % and saponification degree of 99.6 mole %) having an oxygen permeation coefficient of $4 \times 10^{-14}$ cc·cm/cm$^2$·sec·cmHg at a temperature of 20° C. and a relative humidity of 0% and a water absorption of 4.8% at a temperature of 20° C. and a relative humidity of 100% with 25% by weight of an iron type oxygen scavenger, respectively. The water absorptions of the pellets before the formation of the liners after 24 hours' immersion in pure water at 20° C. were 6.1% in case of the pellet for liner A, 0.22% in case of the pellet for liner B and 1.6% in case of the pellet for liner C.

A gas-insulating aluminum foil-laminated bag (having a lamination structure of PET/Al/PP) was filled with 200 ml of air, 1 ml of water and the liner prepared above and was then sealed and stored at 50° C. After the passage of a certain period, the oxygen concentration in air contained in the bag was determined by analysis using a gas chromatograph. It was found that liner A was apparently excellent in the oxygen-absorbing property. The obtained results are shown in Table 1.

EXAMPLE 2

A mixture of a polyolefin composition having an oxygen permeation coefficient of $4 \times 10^{-10}$ cc·cm/cm$^2$·sec·cmHg at a temperature of 20° C. and a relative humidity of 0% with an acrylic acid/vinyl alcohol copolymer (Sumika Gel SP-510) having a water absorption ratio of 600 in pure water and an iron type oxygen scavenger was pelletized in the same manner as described in Example 1, and the pellet was formed into a liner (liner D). The oxygen-absorbing capacity was measured in the same manner as described in Example 1. The obtained results are shown in Table 1. It was found that liner D was apparently excellent over liners B and C.

EXAMPLE 3

A laminate liner (liner E) was formed by laminating a low-density polyethylene film having a thickness of 40 μm on liner A of Example 1. The oxygen-absorbing test was carried out in the same manner as described in Example 1. The obtained results are shown in Table 1. It is seen that the oxygen-absorbing property was somewhat degraded by the lamination but liner E was still excellent over liners B and C.

EXAMPLE 4

A polyolefin composition having an oxygen permeation coefficient of $4 \times 10^{-10}$ cc·cm/cm$^2$·sec·cmHg at a temperature of 20° C. and a relative humidity of 0% and a polypropylene master batch (Sumika Gel GRC PPM-3) of modified polyethylene oxide (Sumika Gel R-30) having a water absorption ratio of 30 in pure water were mixed at a weight ratio of 2/1, and an iron type oxygen scavenger having an average particle size of 12 μm was further mixed in an amount of 25% by weight based on the resin and the mixture was pelletized in the same manner as described in Example 1. An oxygen scavenger-containing olefin resin film (OF) prepared from this pellet was extrusion coated on an aluminum foil by using an extruder having a screw having a diameter of 65 mm and a T-die. A titanate type anchoring agent was used as the anchoring agent. Finally, a laminate comprising 12 μm of PET, 9 μm of Al, 50 μm of OF and 20 μm of PP arranged from the outer side was prepared. A cup-shaped vessel having an inner volume of 85 cm$^3$, which was prepared from a laminate of an aluminum foil and a polypropylene film was charged with 65 ml of water, and the vessel was sealed with the above-mentioned laminate as the heat-sealing lid. Heat sterilization was carried out at 120° C. for 30 minutes, and immediately, the oxygen concentration in the vessel was measured. The oxygen concentration in the head space was 5%, and an apparent effect of absorbing oxygen was attained. For comparison, an ordinary aluminum/PP sealing material was used. In this case, the oxygen concentration was not changed at all.

TABLE 1

| Liner | Absorbed Amount of O$_2$ (ml/lines) | | |
| --- | --- | --- | --- |
| | 1 day | 2 days | 3 days |
| A | 2.0 | 3.1 | 5.2 |

TABLE 1-continued

| Liner | Absorbed Amount of O$_2$ (ml/lines) | | |
|---|---|---|---|
| | 1 day | 2 days | 3 days |
| B | 0.3 | 0.6 | 1.9 |
| C | 0.1 | 0.2 | 1.0 |
| D | 2.4 | 3.6 | 5.8 |
| E | 1.4 | 2.1 | 3.7 |

What is claimed is:

1. An oxygen-absorbing resin composition comprising a blend of:
   (1) a water-absorbing polymer selected from the group consisting of a modified polyethylene oxide, an acrylic acid/vinyl alcohol copolymer, a sodium acrylate polymer and a vinyl-alcohol polymer with
   (2) An olefin resin,
   wherein the polymer and the olefin resin are present in a weight ratio of from 1:99 to 90:10, respectively, and the blend has an oxygen permeation coefficient larger than $10^{-12}$ cc·cm/cm$^2$·sec·cmHg at a temperature of 20° C. and a relative humidity of 0% and a water adsorption of at least 1% in pure water at 20° C.,
   and an oxygen scavenger incorporated into the blend, wherein the oxygen scavenger is present in an amount of 5 to 200 parts by weight, per 100 parts by weight of the blend.

2. A resin composition as set forth in claim 1, wherein the heat-formable resin is a modified polyethylene oxide or an acrylic acid/vinyl alcohol copolymer.

3. A resin composition as set forth in claim 1, wherein the oxygen scavenger comprises reduced iron as a reducing agent and a compound that promotes oxidation, in which the content of copper is lower than 150 ppm based on iron and the content of sulfur is lower than 500 ppm based on iron.

* * * * *